United States Patent
Niu et al.

(10) Patent No.: US 7,942,018 B2
(45) Date of Patent: May 17, 2011

(54) APPARATUS FOR COOLING OR HEATING THERMAL STORAGE USING MICROENCAPSULATED PHASE CHANGE MATERIAL SLURRIES

(75) Inventors: Jianlei Niu, Hong Kong (HK); Xichun Wang, Hong Kong (HK)

(73) Assignee: The Hong Kong Polytechnic University, Hong Kong (CN)

( * ) Notice: Subject to any disclaimer, the term of this patent is extended or adjusted under 35 U.S.C. 154(b) by 776 days.

(21) Appl. No.: 12/024,425

(22) Filed: Feb. 1, 2008

(65) Prior Publication Data

US 2009/0194257 A1    Aug. 6, 2009

(51) Int. Cl.
*F25D 17/02* (2006.01)
(52) U.S. Cl. ........................................................ 62/434
(58) Field of Classification Search .............. 62/59, 434; 165/104.17
See application file for complete search history.

(56) References Cited

U.S. PATENT DOCUMENTS

| | | | |
|---|---|---|---|
| 3,869,870 A | * | 3/1975 | Kuehner .......................... 62/114 |
| 4,696,338 A | * | 9/1987 | Jensen et al. .............. 165/104.17 |
| 4,821,794 A | * | 4/1989 | Tsai et al. ................. 165/104.17 |
| 4,911,232 A | | 3/1990 | Colvin et al. |
| 5,007,478 A | | 4/1991 | Sengupta |
| 6,447,692 B1 | | 9/2002 | Momoda et al. |
| 6,797,193 B2 | | 9/2004 | Brown et al. |

OTHER PUBLICATIONS

Wang, X. et al., "Flow and Heat Transfer Behaviors of Phase Change Material Slurries in a Horizontal Circular Tube", International Journal of Heat and Mass Transfer, 50, pp. 2480-2491, (2007).
Wang, X. et al., "Heat Transfer of Microencapsulated PCM Slurry Flow in a Circular Tube", AIChE Journal, vol. 54, No. 4, pp. 1110-1120, (2008).

* cited by examiner

*Primary Examiner* — Melvin Jones
(74) *Attorney, Agent, or Firm* — George G. Wang; Wilkinson & Grist

(57) ABSTRACT

A thermal storage system includes a thermal storage device that includes an aqueous slurry of micro-encapsulated phase change material, a thermal collector in a heat exchange relationship with the thermal storage device through a first heat exchanger, and a thermal service device in a heat exchange relationship with the thermal storage device through a second heat exchanger. The aqueous slurry of micro-encapsulated phase change material is configured to convert between solid and liquid states.

20 Claims, 4 Drawing Sheets

APPARATUS FOR COOLING OR HEATING THERMAL STORAGE USING MICROENCAPSULATED PHASE CHANGE MATERIAL SLURRIES

BACKGROUND

Thermal storage systems typically use inexpensive off-peak electric power, solar energy or waste heat to meet heating, cooling or hot water requirements. Ice and water have been the traditional storage media to store the thermal energy, but with inherent constraints. Ice storage is limited to the working temperature of around 0° C., which is too low for many applications such as air-conditioning, and is energy inefficient. Water, while convenient to harness, has limited heat storage capacity, as it relies on sensible heat in the temperature range of only 0 to 100° C., and the water storage tank is usually bulky.

Microencapsulated phase change materials (MPCM) offer the flexibility of a wide range of working temperatures when suspended in water to form an aqueous slurry in a thermal storage tank. Phase change materials contained within microcapsules may be frozen into solid states through refrigeration to effect cooling storage. MPCM contained within microcapsules may be melted into liquid state by solar energy or waste heat to effect heat storage. The phase change materials may be used to store thermal energy by cycling between solid and liquid phases. When a liquid material is solidified, heat is released, providing a heating effect, with the accompanying absorption and release of heat, which accomplish the heating or cooling effects.

Therefore, the thermal storage systems that incorporate MPCM may be used to store energy. This thermal storage can allow electricity usage to be shifted towards periods of the day with lower electricity costs. This redistribution of electricity usage can allow peak shaving, which may result in the reduction of the overall electricity capacity requirement. Such a system can also be used to store thermal energy available from natural evaporative cooling and solar heating.

However, MPCM slurries have been used in cooling applications only at low concentrations. One reason for this limitation is that the slurries present non-Newtonian behaviors when the particle volume fractions are higher than about 30 percent. A low MPCM particle concentration corresponds to lower heat storage capacity for a given volume of a storage tank. Moreover, the breakage of particles, which can result from the impact with the pump, may lead to higher pump energy consumption due to agglomeration of the material.

It is desirable to develop a new thermal storage system operating with an MPCM slurry having a particle concentration higher than 30 percent. It is also desirable that such a system has minimal breakage of the MPCM during its performance life.

BRIEF SUMMARY

According to one aspect, a thermal storage system includes a thermal storage device that includes an aqueous slurry of micro-encapsulated phase change material, a thermal collector in a heat exchange relationship with the thermal storage device through a first heat exchanger, and a thermal service device in a heat exchange relationship with the thermal storage device through a second heat exchanger. The aqueous slurry of micro-encapsulated phase change material is configured to convert between solid and liquid states.

According to another aspect, a thermal storage system includes a thermal storage device that includes an aqueous slurry of micro-encapsulated phase change material, a thermal collector in a heat exchange relationship with the thermal storage device through a single heat exchanger, and a thermal service device connect to the heat exchanger and the thermal storage device. The aqueous slurry of micro-encapsulated phase change material is configured to convert between solid and liquid states.

DETAILED DESCRIPTION

Reference will now be made in detail to a particular embodiment of the invention, examples of which are also provided in the following description. Exemplary embodiments of the invention are described in detail, although it will be apparent to those skilled in the relevant art that some features that are not particularly important to an understanding of the invention may not be shown for the sake of clarity.

Furthermore, it should be understood that the invention is not limited to the precise embodiments described below, and that various changes and modifications thereof may be effected by one skilled in the art without departing from the spirit or scope of the invention. For example, elements and/or features of different illustrative embodiments may be combined with each other and/or substituted for each other within the scope of this disclosure and appended claims. In addition, improvements and modifications which may become apparent to persons of ordinary skill in the art after reading this disclosure, the drawings, and the appended claims are deemed within the spirit and scope of the present invention.

Thermal Storage Apparatus

Figure 1:
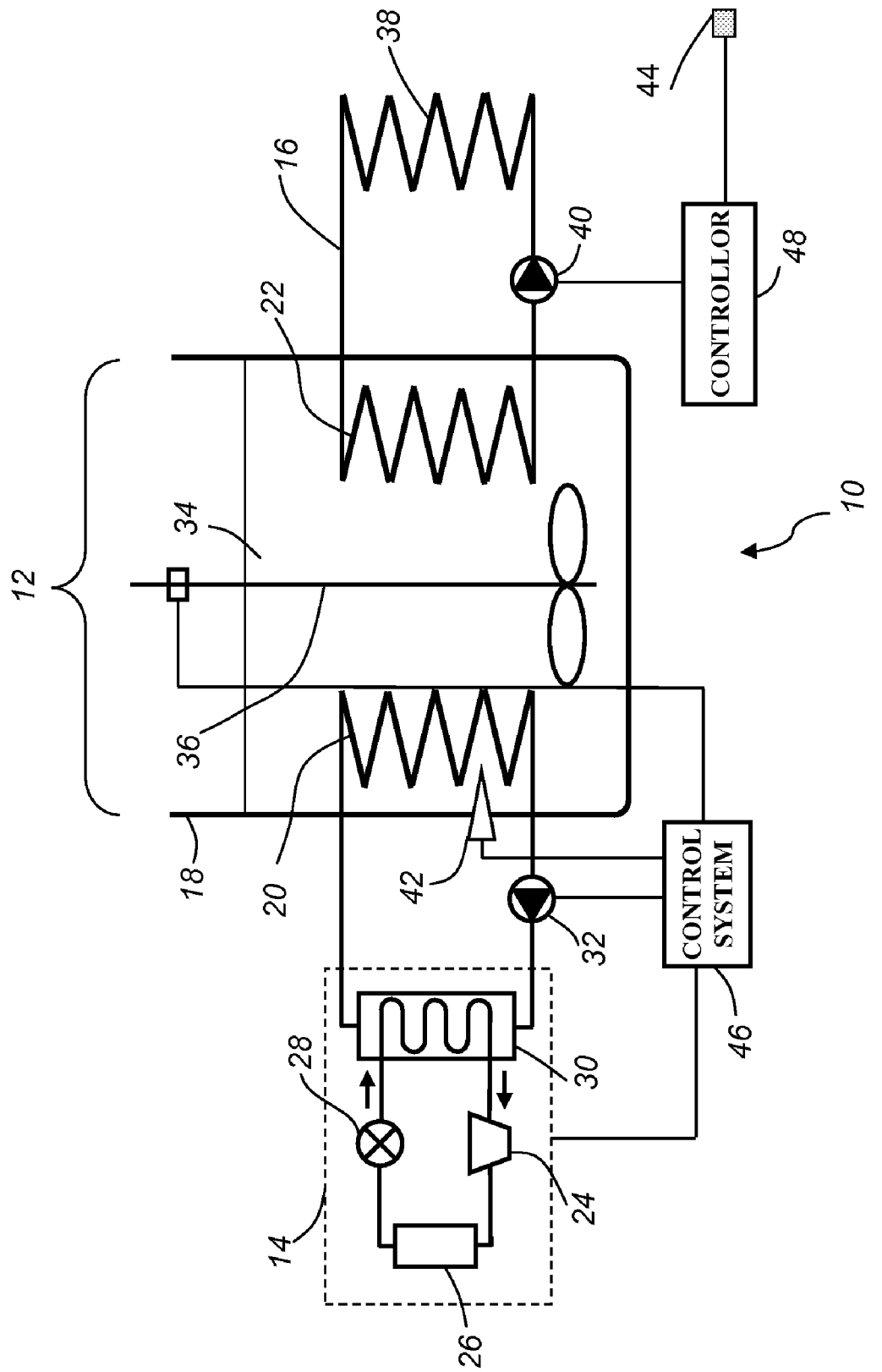
FIG. 1 depicts a thermal storage system having cold storage capability.
Figure 2:
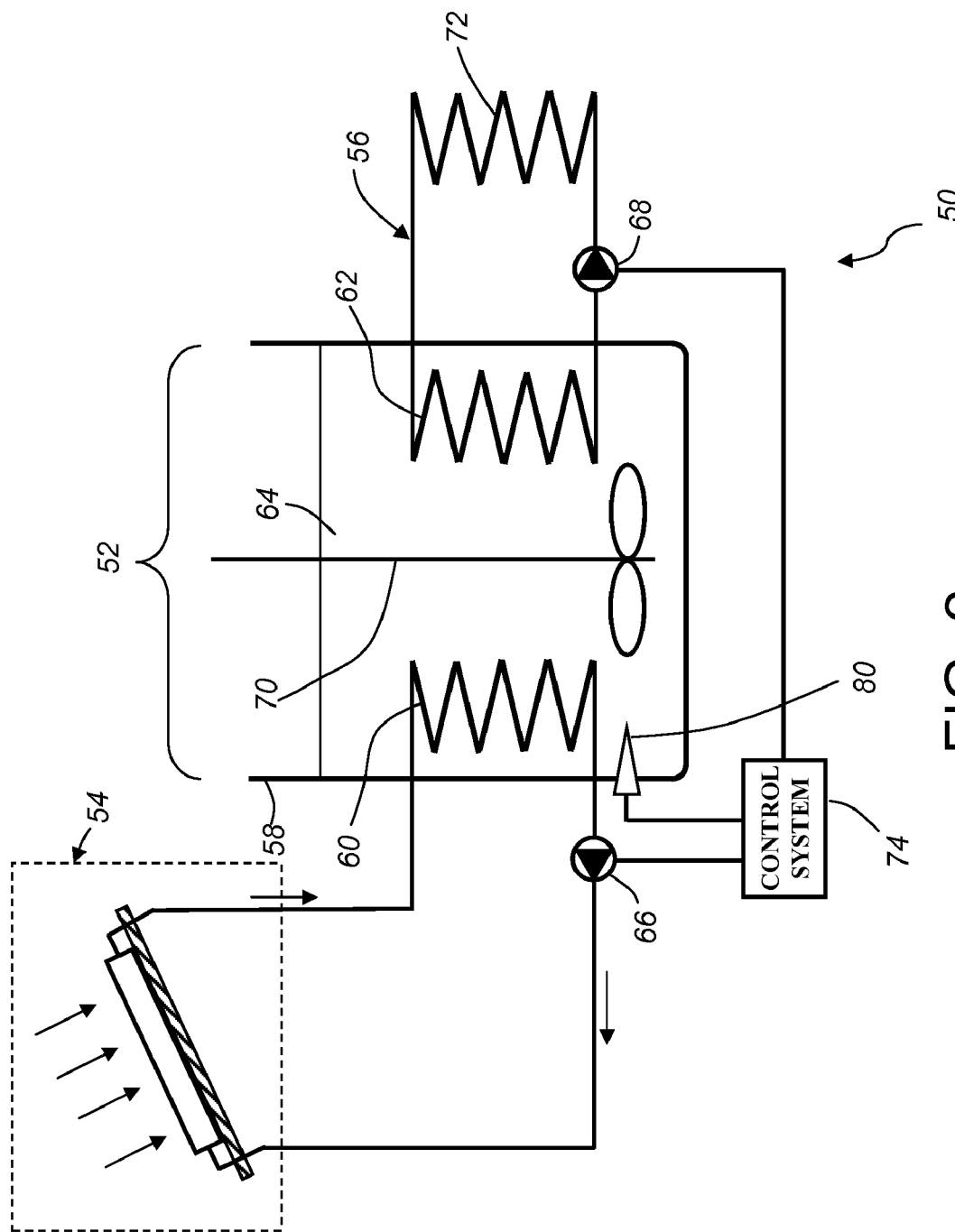
FIG. 2 depicts a thermal storage system having heat storage capability.

A thermal storage system may include a thermal storage device, a thermal collector in a heat exchange relationship with the thermal storage device, and a thermal service device in a heat exchange relationship with the thermal storage device. In a cold storage system, cold energy may be collected from a refrigerator 14, stored in the cold storage device 12, and delivered to the cold service device 16 for use, as depicted in FIG. 1. In a heat storage system, heat energy may be collected from a solar heat collector 54, stored in the heat storage device 52, and delivered to the heat service device 56 for use, as depicted in FIG. 2.

In one embodiment, a cold storage system 10 may include a cold storage device 12, a refrigerator 14 in heat exchange relationship with the cold storage device 12 through a first heat exchanger 20, and a cold service device 16 in a heat exchange relationship with the cold storage device 12 through a second heat exchanger 22, as depicted in FIG. 1. The refrigerator 14 may include a compressor 24, a condenser 26, an expansion valve 28, and an evaporator 30. The cold service device 16 may include a cooling load 38. Examples of a cooling load 38 may include sensible cooling load of the cooled ceiling panels served for an occupied space and cooled load of the coil to cool the air.

The cold storage device 12 may include a vessel 18, where MPCM slurry 34 may be contained within the vessel 18 and used as the cold storage medium. The cold storage device 12 may also include the first heat exchanger 20, which may be immersed in the slurry 34 of the vessel 18, in a heat exchange relationship between the refrigerator 14 and the slurry 34. The cold storage device 12 may further include the second heat exchanger 22, which may also be immersed in the slurry 34 of the vessel 18, in a heat exchange relationship between the cold service device 16 and the slurry 34. Optionally, the first heat exchanger 20 and the second heat exchanger 22 may be combined into a single heat exchanger, such as a heat exchanger having a size smaller than that of the first 20 and second 22 heat exchangers combined.

The first heat exchanger 20 may include a first circulating pump 32, which may be used to circulate a first heat transfer medium that may circulate between the evaporator 30 of the refrigerator 14 and the slurry 34. For example, the first heat transfer medium may include a refrigerant and a glycol solution. Other examples may include water. Therefore, the first heat exchanger 20 may be used to remove heat from the slurry 34, effectively storing cold energy in the slurry.

The term "cold energy" means the potential to absorb heat. A substance that has cold energy can remove heat energy from another substance, causing a phase change and/or a lowering of the temperature of the other substance.

The term "heat energy" means the potential to release heat. A substance that has heat energy can release heat energy to another substance, causing a phase change and/or a rising of the temperature of the other substance.

The second heat exchanger 22 may include a second circulating pump 40, which may be used to circulate a second heat transfer medium that may circulate between the slurry 34 and the cooling load 38 of the cold service device 16. For example, the second heat transfer medium may include a glycol solution. Other examples may include water. The second heat exchanger 22 may be used to discharge the cold energy from the slurry 34 to an end user.

The vessel 18 with heat exchangers 20 and 22 immersed in the slurry 34 may provide indirect charging or discharging of cold energy. Since the MPCM particles are not circulated through a pump, such as 32 or 40, the breakage of the particles can be avoided.

The vessel 18 may be equipped with an agitator 36, such as a variable speed agitator. Agitation of slurry 34 may help to ensure the slurry is homogeneous and ideally mixed. In addition, agitation can increase the rate of heat transfer rate between the slurry 34 and the heat exchangers 20 and 22. The heat transfer rate of the heat exchanges 20 and 22 to charge or discharge the heat energy or cold energy in the MPCM particles may be controlled by adjusting the speed of the agitator 36.

The refrigerator 14 and the first circulating pump 32 may be modulated by a control system 46, based upon a temperature detected by a first temperature sensor 42. For example, during a nighttime period, such as from 22:00 to 6:00, the control system 46 may switch on the refrigerator 14. In this example, when the slurry temperature detected by the temperature sensor 42 is lower than the solidification temperature of the phase change material, the control system 46 may switch off the refrigerator 14.

The second circulating pump 40 may be modulated by a controller 48 connected to a second temperature sensor 44, which can measure a temperature of interest to the user of the device. For example, the second temperature sensor 44 may measure an ambient temperature of a room, an off-coil supply temperature, or another temperature related to the equipment of a room.

MPCM Slurry

The MPCM slurry is configured to remain in the storage device 12, rather than being pumped through pipelines. One advantage of this configuration is that the high heat storage capacity available at higher concentrations of MPCM particles may be achieved without increasing the system pump energy. Another advantage is that the breakage of PCM micro-capsules may be minimized, resulting in longer service life of the system 10, and the ability to recycle the PCM microcapsules.

The MPCM slurry 34 includes phase change particles that are microencapsulated by a thin plastic outer coating. The core material can convert between solid and liquid states. The outer coating has a higher melting temperature and is durable so as to endure thousands of thermal cycles without breakage.

Compared to conventional single-phase heat transfer fluid, phase change slurries offer several advantages. An MPCM slurry may provide for absorption or release of high-density thermal energy from the absorbing or releasing of latent heat during the phase change of MPCM particles. The slurries also may have relatively low variations in operating temperatures, due to the approximately constant temperature during the charging or discharging processes of MPCM. This may offer incentives to use low-grade thermal energies. In addition, the slurries may provide a high heat transfer rate around the particles, due to the large surface area to volume ratio.

In an example, the PCM materials includes a paraffin, which can be made into micro-capsules using micro-encapsulation technology. Examples include tetradecane with a melting temperature ($T_m$) of 5.5° C., 1-bromohexadecane ($C_{16}H_{33}Br$) with a $T_m$ of 14.3° C., and hexadecane with a $T_m$ of 16.7° C. The large latent heat of fusion of the paraffin type MPCM slurry may also be used to increase the heat transfer capacity due to the large surface area to volume of the MPCM particles in fluid. Slurries containing these particles may result in a compact energy storage system.

The particle concentration of the slurry used for this system 10 may be increased to up to 30 percent, since no pumping through the pipelines is required. In conventional systems the increased viscosity at this high concentration would cause undesirably high pump energy consumption. For example, the dynamic viscosity of a slurry with 20% particle mass concentration is 20.4 mPa·s at 20° C., while the viscosity of slurry with 30% concentration is 41.9 mPa·s at the same temperature.

Operation

During an operation mode of cold storage, cold energy may be first generated from the refrigerator 14. By circulating the first heat transfer medium, the cold energy may be collected from the refrigerator 14 and transferred to the MPCM slurry 34 through the first heat exchanger 20. The cold energy transferred from the refrigerator 14 may convert the liquid cores of the MPCM particles into solid cores, storing cold energy in the MPCM slurry 34 as latent energy of fusion. Therefore, the system 10 may be used to store cold energy during a non-peak-electricity period where energy cost would be lowest.

To dispatch the cold energy to an end user, the second heat transfer medium may be circulated, delivering heat to the slurry. The corresponding of the MPCM particles may then change from solid to liquid, discharging the cold energy as latent energy of fusion to the cooling load 38 of the cold service device 16 through the second heat exchanger 22. Therefore, the system 10 may be used to deliver sensible heat at a peak-electricity period where energy cost would otherwise be highest.

Heat Storage

In a second embodiment, a heat storage system 50 may include a heat storage device 52, a solar heat collector 54 in a heat exchange relationship with the heat storage device 52, and a heat service device 56 in a heat exchange relationship with the heat storage device 52, as depicted in FIG. 2. The solar heat collector 54 may be any commercially available collector. The heat service device 56 may include a heating load 72. Examples of a heating load 72 may include a domestic heater or a hot water heater.

The heat storage device 52 may include a vessel 58, where an MPCM slurry 64 may be contained within the vessel 58 and used as the heat storage medium. The heat storage device 52 also may include a first heat exchanger 60, which may be immersed in the slurry 64 of the vessel 58, in a heat exchange relationship between the solar heat collector 54 and the slurry 64. The heat storage device 52 may further include a second heat exchanger 62, which may also be immersed in the slurry 64 of the vessel 58, in a heat exchange relationship between the heat service device 56 and the slurry 64. Optionally, the first heat exchanger 60 and the second heat exchanger 62 may be combined into a single heat exchanger, such as a heat exchanger having a size smaller than that of the first 60 and second 62 heat exchangers combined.

The first heat exchanger 60 may include a first circulating pump 66, which may be used to circulate a third heat transfer medium that may circulate between the solar heat collector 54 and the slurry 64. For example, the third heat transfer medium may include glycol solution. Other examples may include water. Therefore, the first heat exchanger 60 may be used to charge the heat energy to the slurry 64, effectively storing heat energy in the slurry.

The second heat exchanger 62 may include a second circulating pump 68, which may be used to circulate a fourth heat transfer medium that may circulate between the slurry 64 and the heating load 72 of the heat service device 56. For example, the fourth heat transfer medium may include glycol solution. Other examples may include water. The second heat exchanger 62 may be used to discharge the heat energy from the slurry 64 to an end user.

The vessel 58 with heat exchangers 60 and 62 immersed in the slurry 64 may provide indirect charging or discharging of heat energy. Since the MPCM particles are not circulated through a pump, such as 66 or 68, the breakage of the particles can be avoided.

The vessel 58 may be equipped with an agitator 70, such as a variable speed agitator. Agitation of slurry 64 may help to ensure the slurry is homogeneous and ideally mixed. In addition, agitation can increase the rate of heat transfer rate between the slurry 64 and the heat exchangers 60 and 62. The heat transfer rate of the heat exchanges 60 and 62 to charge or discharge the heat energy or cold energy in the MPCM particles may be controlled by adjusting the speed of the agitator 70.

The first circulating pump 66 and the second circulating pump 68 may be modulated by a control system 74, based on a temperature detected by a third temperature sensor 80. For example, during a daytime period, the control system 74 may switch on the first circulating pump 66, and the heat collected from the solar collector 54 will be stored in the vessel 58. During the heat release period, the control system 74 may switch on the pump 68, and the heat is transferred to heating load 72 by the heat exchanger 62.

MPCM Slurry

The MPCM slurry is configured to remain in the storage device 50, rather than being pumped through the pipelines. In an example, the PCM materials includes a paraffin, which can be made into micro-capsules using micro-encapsulation technology. Examples include Heneicosane ($T_m=40.2°$ C.), Docosane ($T_m=44°$ C.) and Trocosane ($T_m=47.5°$ C.).

Operation

During an operation mode of heat storage, heat energy may be first collected from the solar heat collector 54. By circulating the third heat transfer medium, the heat energy may be collected from the solar heat collector 54 and transferred to the MPCM slurry 64 through the first heat exchanger 60. The heat energy transferred from the heat collector 54 may convert the solid cores of the MPCM particles into liquid cores, storing heat energy in the MPCM slurry 64 as latent energy of fusion. Therefore, the system 50 may be used to store heat energy during a non-peak-electricity period where energy cost would be lowest.

To dispatch the heat energy to an end user, the fourth heat transfer medium may be circulated, absorbing heat from the slurry. The cores of the MPCM particles may then change from liquid to solid, discharging the heat energy as latent energy of fusion to the cooling load 72 of the heat service device 56 through the second heat exchanger 62. Therefore, the system 50 may be used to deliver sensible heat at a peak-electricity period where energy cost would otherwise be highest.

Thermal Storage System with One Heat Exchanger

Figure 3:
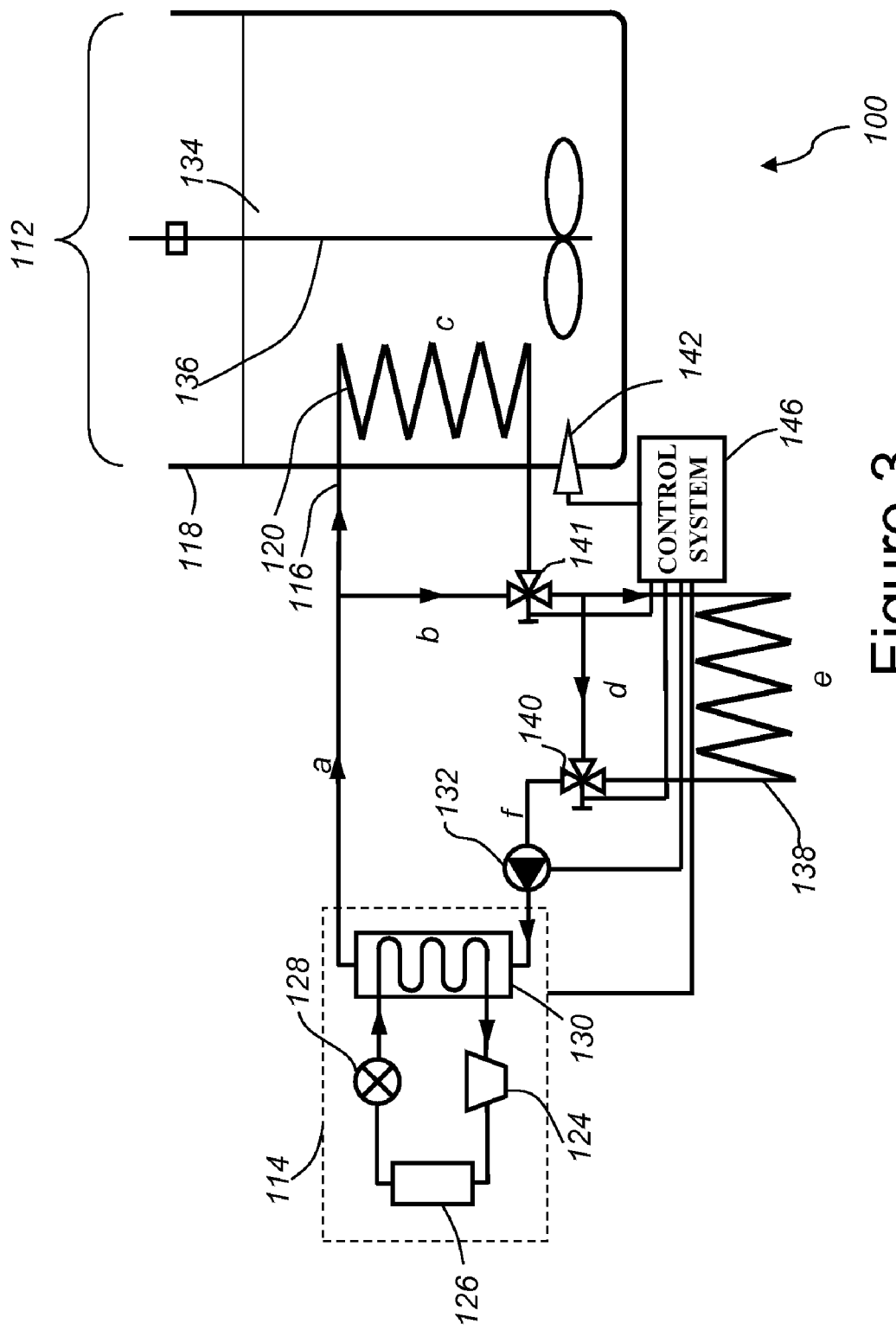
FIG. 3 depicts a thermal storage system having cold storage capability with a single heat exchanger.

In a third embodiment, a cold storage system 100 may include a cold storage device 112, a refrigerator 114 and a cooling load 138. The refrigerator 114 and the cooing load 138 are in a heat exchange relationship with the cold storage device 112 through a single heat exchanger 120, as depicted in FIG. 3.

The refrigerator 114 may include a compressor 124, a condenser 126, an expansion valve 128, and an evaporator 130. Examples of a cooling load 138 may include sensible cooling load of the cooled ceiling panels served for an occupied space and cooled load of the coil to cool the air.

The cold storage device 112 may include a vessel 118, where an MPCM slurry 134 may be contained within the vessel 118 and used as the cold storage medium. The cold storage device 112 may also include the heat exchanger 120, which may be immersed in the slurry 134 of the vessel 118. The heat exchanger 120 may have a size smaller than two separate exchangers. This may leave more space for the slurry 134 in the vessel 118, and therefore reduce the required vessel size.

The heat exchanger 120 may include a circulating pump 132, which may be used to circulate the first heat transfer medium that may circulate between the evaporator 130 of the refrigerator 114 and the slurry 134. For example, the first heat transfer medium may include a refrigerant and a glycol solution. Other examples may include water. Therefore, the first heat exchanger 120 may be used to remove heat from the slurry 134, effectively storing cold energy in the slurry.

The vessel 118 with heat exchanger 120 immersed in the slurry 134 may provide indirect charging or discharging of cold energy. Since the MPCM particles are not circulated through a pump, such as 132, the breakage of the particles can be avoided.

The vessel 118 may be equipped with an agitator 136, such as a variable speed agitator. Agitation of slurry 134 may help to ensure the slurry is homogeneous and ideally mixed. In addition, agitation can increase the rate of heat transfer rate between the slurry and the heat exchangers. The heat transfer rate of the heat exchange 120 to charge or discharge the heat energy or cold energy in the MPCM particles may be controlled by adjusting the speed of the agitator 136.

The refrigerator 114, the circulating pump 132, two three-way control valves 140 and 141, and a pipe system a to f may be modulated by a control system 146, based upon the temperate detected by a temperature sensor 142. In this example, during a nighttime period, such as from 22:00 to 6:00, the control system 146 may switch on the refrigerator 114, and when the slurry temperature detected by the temperature sensor 142 is lower than the solidification temperature of the phase change material, the control system 146 may switch off the refrigerator 114.

The MPCM slurry is configured to remain in the storage device 112, rather being pumped through the pipelines. In an example, the PCM materials includes a paraffin, which can be made into micro-capsules using micro-encapsulation technology. Examples include tetradecane with a melting temperature ($T_m$) of 5.5° C., 1-bromohexadecane ($C_{16}H_{33}Br$) with a $T_m$ of 14.3° C., and hexadecane with a $T_m$ of 16.7° C.

Operation

During an operation mode of cold storage, cold energy may be first collected from the refrigerator 114. By circulating the heat transfer medium, the cold energy may be collected from the refrigerator 114 and transferred to the MPCM slurry 134 through the heat exchanger 120 in the path a-c-d-e and by modulating the three-way control valves 140 and 141. The cold energy transferred from the refrigerator 114 may convert the liquid cores of the MPCM particles into solid cores, storing cold energy in the MPCM slurry 134 as latent energy of fusion. Therefore, the system 100 may be used to store latent cold energy during a non-peak-electricity period where energy cost would be lowest.

To dispatch the cold energy to an end user, the heat transfer medium may flow in the path a-c-e-f to transfer the cold energy in the vessel 118 through the heat exchanger 120 by controlling the three-way control valves 140 and 141. Then the cold energy may be released to the cooling load 138 by transferring the cold energy in cold service device 116.

When the cold energy stored in the vessel 118 is not sufficient to service the cooling load 138, the refrigerator 114 may then be switched on and the heat transfer medium may flow in the path a-b-e-f by controlling the three-way control valve 140 and 141. Thus, the refrigerator 114 may directly supply the cooling load 138 in this operation mode.

Solar Water Heater

Figure 4:
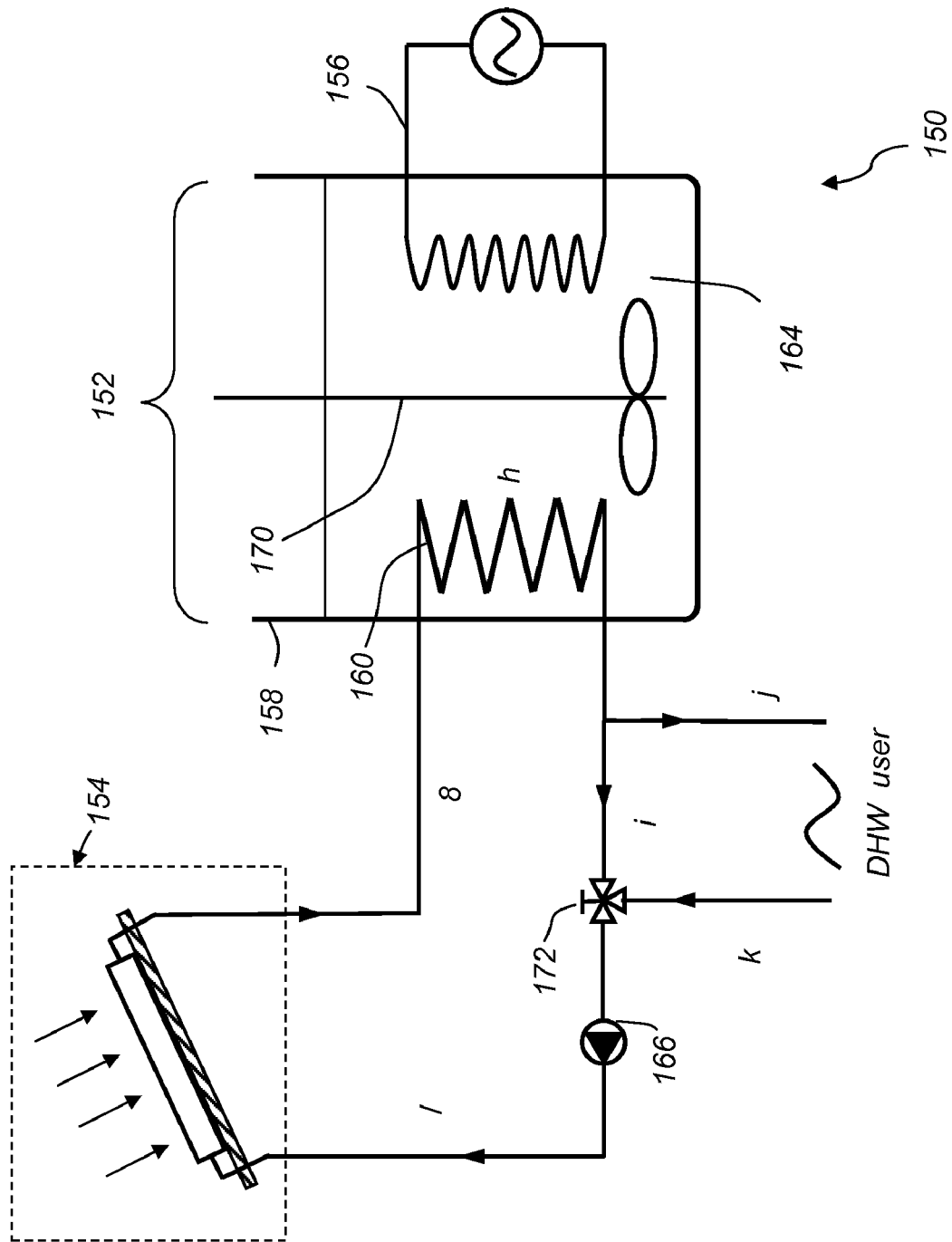
FIG. 4 depicts a thermal storage system having heat storage capability with a single heat exchanger and auxiliary electric heating.

In the fourth embodiment, a heat storage system 150 for hot water generation may include a heat storage device 152, a solar heat collector 154 in a heat exchange relationship with the heat storage device 152, and a heat service device 156 in a heat exchange relationship with the heat storage device 152, as depicted in FIG. 4. The solar heat collector 154 may be any commercially available collector.

The heat storage device 152 may include a vessel 158, where an MPCM slurry 164 may be contained within the vessel 158 and used as the heat storage medium. The heat storage device 152 also may include a single heat exchanger 160, which may be immersed in the slurry 164 of the vessel 158, in a heat exchange relationship between the solar heat collector 154 and the slurry 164. The heat storage device 152 may further include the heat service device 156, such as an auxiliary electricity heating system, which may also be immersed in the slurry 164 of the vessel 158, in a heat exchange relationship between the heat service device 156 and the slurry 164. The auxiliary electricity heating system is configured to provide additional heat generation to the vessel 158.

The heat exchanger 160 may include a circulating pump 166, which may be used to circulate a heat transfer medium that may circulate between the solar heat collector 154 and the slurry 164 through a three-way control valve 172 and a pipe system g to l. For example, the heat transfer medium may include glycol solution. Other examples may include water. Therefore, the heat exchanger 160 may be used to charge the heat energy to the slurry 164, effectively storing heat energy in the slurry.

The vessel 158 with heat exchanger 160 immersed into the slurry 164 may provide indirect charging or discharging of heat energy. Since the MPCM particles are not circulated through a pump, such as 66 or 68, the breakage of the particles can be avoided.

The vessel 158 may be equipped with an agitator 170, such as a variable speed agitator. Agitation of slurry 164 may help to ensure the slurry is homogeneous and ideally mixed. In addition, agitation can increase the rate of heat transfer rate between the slurry and the heat exchangers. The heat transfer rate of the heat exchange 160 to charge or discharge the heat energy or cold energy in the MPCM particles may be controlled by adjusting the speed of the agitator 170.

MPCM Slurry

The MPCM slurry is configured to remain in the storage device 150, rather than being pumped through the pipelines. In an example, the PCM materials includes a paraffin, which can be made into micro-capsules using micro-encapsulation technology. Examples include Heneicosane ($T_m$=40.2° C.), Docosane ($T_m$=44° C.) and Trocosane ($T_m$=47.5° C.).

Operation

During an operation mode of heat storage, heat energy may be first collected from the solar heat collector 154. By circulating the heat transfer medium, the heat energy may be collected from the solar heat collector 154 and transferred to the MPCM slurry 164 through the heat exchanger 160 in the path g-h-i-l and by modulating the three-way control valve 172. The heat energy transferred from the solar heat collector 154 may convert the solid cores of the MPCM particles into liquid cores and stored in the MPCM slurry 164 as latent energy of fusion.

To dispatch the heat energy to an end user, the heat transfer medium may flow in the path of k-l-g-h-j by controlling the three-way control valve 172, thus the hot water may be obtained by transferring the heat stored in the vessel 158 to the user.

The thermal storage system is further illustrated by the following examples, which are not to be construed in any way as imposing limitations upon the scope thereof. On the contrary, it is to be clearly understood that resort may be had thereof which, after reading the description herein, may suggest themselves to those skilled in the art without departing from the spirit of the specification and/or the scope of the appended claims.

EXAMPLE

Example 1

The Cooling Storage Using Night Time Electricity Refrigeration

A working system as depicted in FIG. 1 was set up. The vessel 18 contained about 150 kg of MPCM slurry with 29% hexadecane micro-capsules with mean diameter of 8 µm. The hexadecane was measured to have a melting temperature of 15.9° C., a primary solidification temperature of 13.3° C., and a latent heat of 138 J/g. An air-cooled chiller system supplied chilled water at the temperature of 10° C. to the first heat exchanger 20 during the night, to cool the MPCM slurry to a temperature of around 12° C. During the day, the chiller was turned off, but the second heat exchanger 22 was able to supply cooled water at around 18° C. to a radiant ceiling panel in a demonstration room.

While the example of the thermal storage system have been described, it should be understood that the composition not so limited and modifications may be made. The scope of the system is defined by the appended claims, and all devices that come within the meaning of the claims, either literally or by equivalence, are intended to be embraced therein.

What is claimed is:

1. A thermal storage system, comprising:
   a thermal storage device comprising an aqueous slurry of micro-encapsulated phase change material;
   a thermal collector in a heat exchange relationship with said thermal storage device through a first heat exchanger; and
   a thermal service device in a heat exchange relationship with said thermal storage device through a second heat exchanger,
   wherein said aqueous slurry of micro-encapsulated phase change material is configured to convert between solid and liquid states.

2. The system of claim 1, wherein said thermal storage device comprises a cold storage device, said thermal collector comprises a refrigerator, and said thermal service device comprises a cold service device.

3. The system of claim 2, wherein said cold storage device comprises a vessel for containing said slurry.

4. The system of claim 2, wherein said phase change material is selected from the group consisting of tetradecane, 1-bromohexadecane, hexadecane, and combinations thereof.

5. The system of claim 2, further comprising a first circulating pump for circulating a first heat transfer medium between said refrigerator and said slurry.

6. The system of claim 5, further comprising a control system for modulating said first circulating pump and said refrigerator, based on the reading of a first temperature sensor of said slurry temperature.

7. The system of claim 5, further comprising a second circulating pump for circulating a second heat transfer medium between said slurry and said cold service device.

8. The system of claim 7, wherein said cold service device comprises a cooling load.

9. The system of claim 7, further comprising a second temperature sensor for detecting temperature of the ambient.

10. The system of claim 9, further comprising a controller for modulating said second circulating pump, based on the reading of said second temperature sensor.

11. The system of claim 2, wherein said refrigerator comprises a compressor, a condenser, an expansion valve and an evaporator.

12. The system of claim 1, wherein said thermal storage device comprises a heat storage device, said thermal collector comprises a solar heat collector, and said thermal service device comprises a heat service device.

13. The system of claim 12, wherein said phase change material is selected from the group consisting of heneicosane, docosane, trocosane, and combinations thereof.

14. The system of claim 12, further comprising a third circulating pump for circulating a third heat transfer medium between said solar heat collector and said slurry.

15. The system of claim 14, further comprising a fourth circulating pump for circulating a fourth heat transfer medium between said heat service device and said slurry.

16. The system of claim 15, wherein said heat service device comprises a heating load.

17. The system of claim 16, further comprising a control system for modulating said third circulating pump and said fourth circulating pump, based on the reading of a third temperature sensor of said slurry temperature.

18. A thermal storage system, comprising:
    a thermal storage device comprising an aqueous slurry of micro-encapsulated phase change material;
    a thermal collector in a heat exchange relationship with said thermal storage device through a single heat exchanger; and
    a thermal service device connected to said heat exchanger and said thermal storage device,
    wherein said aqueous slurry of micro-encapsulated phase change material is configured to convert between solid and liquid states.

19. The system of claim 18, further comprising an auxiliary electric heating system in heat transfer relationship with said thermal storage device.

20. The system of claim 18, further comprising a control system for modulating the thermal collector, based on the reading of a temperature sensor.

* * * * *